United States Patent
Furuhata et al.

(10) Patent No.: US 9,132,685 B2
(45) Date of Patent: Sep. 15, 2015

(54) UV INK FIXED STRUCTURE AND UV INK PRINTING METHOD

(75) Inventors: Tomotaka Furuhata, Nagano (JP); Masakatsu Okawa, Nagano (JP); Wataru Hioki, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 14/342,391

(22) PCT Filed: Sep. 6, 2012

(86) PCT No.: PCT/JP2012/072694
§ 371 (c)(1),
(2), (4) Date: Mar. 3, 2014

(87) PCT Pub. No.: WO2013/035770
PCT Pub. Date: Mar. 14, 2013

(65) Prior Publication Data
US 2014/0227494 A1    Aug. 14, 2014

(30) Foreign Application Priority Data

Sep. 6, 2011    (JP) ................................. 2011-194186

(51) Int. Cl.
| | |
|---|---|
| *B32B 3/00* | (2006.01) |
| *B41M 5/00* | (2006.01) |
| *B32B 27/00* | (2006.01) |
| *B41J 2/01* | (2006.01) |
| *B05D 3/06* | (2006.01) |

(52) U.S. Cl.
CPC .............. *B41M 5/0017* (2013.01); *B32B 27/00* (2013.01); *B41J 2/01* (2013.01); *B05D 3/067* (2013.01); *B41M 5/0011* (2013.01); *Y10T 428/24802* (2015.01)

(58) Field of Classification Search
CPC ...... C09D 11/30; C09D 11/101; C09D 5/002; Y10T 428/24802; Y10T 428/24851; B41M 5/0047; B41M 7/009
See application file for complete search history.

(56) References Cited

U.S. PATENT DOCUMENTS

| | | | |
|---|---|---|---|
| 2009/0176905 A1* | 7/2009 | Matsuzawa et al. | 522/46 |
| 2010/0330359 A1* | 12/2010 | Ishikawa et al. | 428/325 |
| 2012/0059080 A1* | 3/2012 | Fukushima et al. | 522/64 |
| 2012/0295040 A1* | 11/2012 | Kuki | 428/1.31 |

FOREIGN PATENT DOCUMENTS

| | | |
|---|---|---|
| JP | 2003-270403 | 9/2003 |
| JP | 2004-085925 | 3/2004 |
| JP | 2004-532144 | 10/2004 |
| JP | 2004-358464 | 12/2004 |
| JP | 2005-007577 | 1/2005 |
| JP | 2005-043749 | 2/2005 |

OTHER PUBLICATIONS

"International Search Report (Form PCT/ISA/210)", mailed on Nov. 13, 2012, with English translation thereof, p. 1-p. 4 in which the listed references (JP2004-085925, JP2004-358464, JP2005-043749, and JP2003-270403) were cited.

* cited by examiner

*Primary Examiner* — Elizabeth Mulvaney
(74) *Attorney, Agent, or Firm* — Jianq Chyun IP Office

(57) ABSTRACT

A fixed structure and a printing method are provided with which cracking and detachment of a UV ink coating do not occur even when a UV ink of high surface hardness is used. As a solution, an adhesive primer layer 12 is provided between a substrate 11, and a UV ink coating 16 having a surface hardness higher than a pencil hardness H.

4 Claims, 3 Drawing Sheets

|  | Primer printing density | | | | | | | | | |
|---|---|---|---|---|---|---|---|---|---|---|
|  | 10% | 20% | 30% | 40% | 50% | 60% | 70% | 80% | 90% | 100% |
| Adhesion improving effect | × | × | ○ | ○ | ○ | ○ | ○ | ○ | ○ | ○ |
| Cracking of an ink layer (acryl) | ○ | ○ | ○ | × | × | × | × | × | × | × |
| Cracking of an ink layer (SUS) | ○ | ○ | ○ | ○ | ○ | × | × | × | × | × |

FIG. 5

UV INK FIXED STRUCTURE AND UV INK PRINTING METHOD

CROSS-REFERENCE TO RELATED APPLICATION

This application is a 371 application of an international PCT application Ser. No. PCT/JP2012/072694, filed on Sep. 6, 2012, which claims the priority benefit of Japan application no. JP 2011-194186, filed on Sep. 6, 2011. The entirety of each of the above-mentioned patent applications is hereby incorporated by reference herein and made a part of this specification.

TECHNICAL FIELD

The present invention relates to a UV ink fixed structure formed by irradiation of UV curable ink with ultraviolet light, and to a UV ink printing method.

BACKGROUND ART

UV (Ultra Violet) curable inks that cure upon exposure to ultraviolet light have been used in a variety of applications.

For example, Patent Literature 1 discloses a printing method that uses an UV ink for inkjet printers. According to Patent Literature 1, printing an UV ink via a primer when non-absorbable media are used for printing is described.

With the use of the primer, the technique described in Patent Literature 1 can make the wettability of UV ink droplets constant, making it possible to stabilize the diameter of the landed UV ink droplet, and improve print quality.

Patent Literature 2 discloses a method for printing a UV ink via a primer using an inkjet printer.

Patent Literature 2 discloses printing on primer-treated media with an inkjet printer. The technical idea described in this publication is that a UV ink can uniformly adhere to media of various different materials because of the primer treatment of media. Patent Literature 2 also describes adjusting the thickness of a primer layer to ensure substrate surface wettability, and improve UV ink adhesion.

CITATION LIST

Patent Literature

Patent Literature 1: JP-A-2005-7577
Patent Literature 2: JP-A-2004-532144

SUMMARY OF INVENTION

Technical Problem

Patent Literature 1 and Patent Literature 2 both disclose printing a UV ink on media via a primer. However, neither of these literatures describes using a top-coating UV ink of high surface hardness for printing.

The present inventors conducted extensive studies to make an UV ink of high surface hardness (pencil hardness H or more) adhere to media (hereinafter, also referred to as "substrate"), and found that the UV ink encounters problems during the cure, specifically cracking, and detachment from the substrate due to factors such as cure shrinkage and temperature changes.

Against such cracking and detachment of UV ink, attempts were made to provide a primer layer that can follow the shrinkage of the UV ink as the shrinkage occurs between the UV ink coating and a substrate.

However, simply using a soft primer was not sufficient to solve the problems. Specifically, certain properties of the primer produced no adhesion for the UV ink, and caused detachment, or cracking occurred in the UV ink coating.

The present invention has been made to solve the foregoing problems, and it is an object of the present invention to provide a fixed structure and a printing method with which cracking and detachment of a UV ink coating do not occur even, when a UV ink of high surface hardness is used.

Solution to Problem

A UV ink fixed structure according to the present invention includes a substrate, a UV ink coating having a surface hardness higher than a pencil hardness H, and an adhesive primer layer provided between the substrate and the UV ink coating.

With this configuration, adhesion that can accommodate the cure shrinkage of the UV ink can be ensured by the use of the adhesive primer layer. A thick primer layer causes cracking in the UV ink coating because of strains that occur at the interface as the ambient temperature-dependent volume change becomes greater in the primer than in the UV ink coating.

After intensive studies, the present inventors found that such strains at the interface can be reduced, and cracking in the UV ink coating can be suppressed by keeping the thickness of the primer layer low, specifically by reducing the volume of the primer layer. With a primer layer having adhesion that can accommodate the cure shrinkage of the UV ink coating, and a thickness sufficient to suppress cracking in the UV ink coating, it is possible to prevent detachment that occurs in response to the cure shrinkage of the UV ink coating, and suppress cracking in the UV ink coating.

It is preferable in the UV ink fixed structure according to the present invention that the UV ink coating be formed over a wider range than a range of the primer layer formed.

In this way, the UV ink coating completely coats the adhesive primer layer. The adhesive primer layer is thus prevented from being exposed, and sticking to other portions.

It is preferable in the UV ink fixing structure according to the present invention that the primer layer be formed by inkjet printing in 20% to 50% of a total deposition area.

The primer is landed on the substrate preferably in this range because desirable adhesion cannot be obtained when the proportion of the primer layer deposited by inkjet printing is less than 20%, and cracking occurs when the proportion of the primer layer is more than 50%.

A printing method according to the present invention includes printing an adhesive primer with an inkjet recording apparatus to formed on a primer layer on a UV ink substrate, and printing a UV ink with the inkjet recording apparatus to form a UV ink coating on the primer layer, the UV ink exhibiting a surface hardness higher than a pencil hardness H upon being cured.

With this method, cracking and detachment of the UV ink coating due to the cure shrinkage of the UV ink coating can be prevented with the adhesive primer layer in printing that uses a UV ink of high surface hardness. Further, because the primer layer and the UV ink are printed with an inkjet recording apparatus, the UV ink can immediately cover the primer layer even when the printed primer is adhesive. The adhesive primer layer can thus be prevented from being exposed, and sticking to other members.

It is preferable in the printing method according to the present invention that the inkjet recording apparatus prints the primer layer in 20% to 50% of a total deposition area.

The primer is landed on the substrate preferably in this range because desirable adhesion cannot be obtained when the proportion of the primer layer deposited by the inkjet recording apparatus is less than 20%, and cracking occurs when the proportion of the primer layer is more than 50%.

Advantageous Effects of Invention

With the UV ink fixing method and the printing method of the present invention, detachment and cracking of a UV ink coating can be prevented even when a UV ink of high surface hardness is used.

BRIEF DESCRIPTION OF DRAWINGS

FIG. 5 is a table representing the relationship between primer ejection amount and UV ink detachment and cracking.

DESCRIPTION OF EMBODIMENTS

A preferred embodiment of the present invention is described below with reference to the accompanying drawings.

Figure 1:
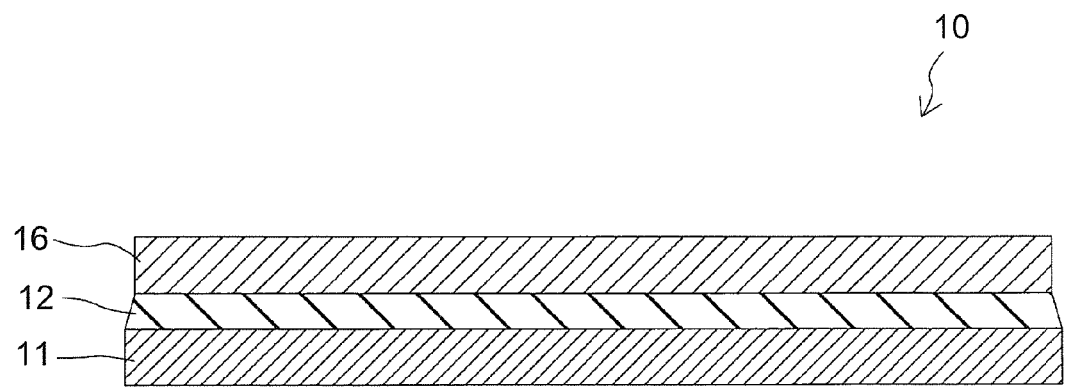
FIG. 1 is a schematic cross sectional view of a UV ink fixed structure according to the present invention.

FIG. 1 represents an exemplary UV ink fixed structure.

A UV ink fixed structure 10 of the present embodiment is structured to include a substrate 11, a primer layer 12, and a UV ink coating 16 formed on the primer layer 12. The primer layer 12 is completely covered by the UV ink coating 16, and is not exposed.

The material of the substrate 11 is not particularly limited. For example, synthetic resins such as PP (polypropylene), PET (polyethylene terephthalate), PC (polycarbonate), and acrylic resin may be used. The acrylic resin may be PMMA (polymethylmethacrylate resin).

Aside from the synthetic resins, for example, metals such as stainless steel, aluminum, and brass may be used. Inorganic materials such as ceramic, earthenware, and glass also may be used.

The UV ink used to form the UV ink coating 16, and the UV ink is of a type that undergoes a polymerization reaction and curing upon exposure to ultraviolet light.

More specifically, the components of the UV ink include a photopolymerizable oligomer or monomer, a photopolymerization initiator (catalyst), a pigment, and auxiliary agents such as a defoaming agent. Upon exposure to ultraviolet light, the photopolymerization initiator generates radicals, which then start polymerization of the oligomer. By the polymerization reaction, the UV ink becomes resin-like, and fuses with the target in the printed state. Among the various types of photopolymerization initiators, commonly used are benzophenone, benzoin, acetophenone, thioxanthone, and acylphosphine oxide photopolymerization initiators.

The UV ink used in the present embodiment exhibits high surface hardness upon being cured. As used herein, "high surface hardness" means a pencil hardness H or more.

For example, the LF140 (product name) UV ink produced by the present applicant has a pencil hardness 3 H when cured without a primer, and a pencil hardness H when a primer layer is provided between the UV ink and the substrate. The LH100 (product name) UV ink has a pencil hardness 6 H when cured without a primer, and a pencil hardness 3 H when a primer layer is provided between the UV ink and the substrate.

The primer layer 12 of the present invention is an adhesive primer. The adhesive primer may be any primer, provided that it has the property to bond the substrate 11 and the UV ink coating 16.

In the present embodiment, a UV curable adhesive paste is used to provide adhesion. By being UV curable, the primer can be cured after being ejected by an inkjet recording apparatus.

Preferably, the primer is not solvent resistant. By not being solvent resistant, the primer can melt and adhere to the UV ink ejected onto the top surface of the primer layer 12, and improve adhesion.

By being adhesive, the primer layer 12 can shrink to accommodate the cure shrinkage of the UV ink, and ensure adhesion between the primer layer 12 and the UV ink coating 16.

Adhesion suffers, and detachment of the UV ink coating 16 occurs when the primer layer 12 is thin. A thick primer layer 12 causes cracking in the UV ink coating as the temperature-dependent volume change becomes greater in the primer than in the UV ink coating. Detachment and cracking of the UV ink coating 16 can thus be suppressed at the same time by adjusting the thickness of the adhesive primer layer 12.

Figure 2:
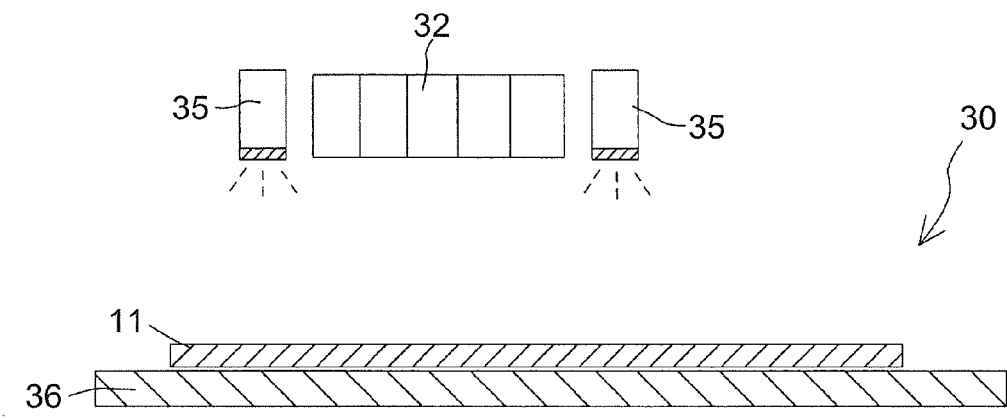
FIG. 2 is a diagram representing a schematic structure of an inkjet recording apparatus.

FIG. 2 represents a schematic structure of an inkjet recording apparatus for printing an UV ink.

In the printing method of the present embodiment, the primer and the UV ink are printed on the substrate 11 with an inkjet recording apparatus 30.

The inkjet recording apparatus 30 performs inkjet printing on the substrate 11 placed on a platen 36. The UV ink is ejected through a recording head 32 that has a plurality of ejection nozzles provided for different colors, and moves back and forth in scan direction. The recording head 32 also ejects the primer.

The inkjet recording apparatus 30 has a carriage equipped with a UV curing light source 35. The light source 35 is a means to radiate ultraviolet light, and may be realized by, for example, an LED (Light Emitting Diode). Using an LED can save heat generation, and contribute to save energy.

Aside from an LED, a metal halide lamp may be used as the light source 35. The metal halide lamp is a lamp with the sealed halogenated metal and mercury. A UV curing metal halide lamp can continuously output ultraviolet light, for example, in a 250 nm to 450 nm range.

The light source 35 also may be realized by a high-pressure mercury lamp.

The printing method of the present embodiment using the inkjet recording apparatus is described below with reference to FIG. 3.

First, the recording head 32 ejects and prints the primer on the substrate 11 placed on the top surface of the platen 36 (step S1). In the primer printing, the primer is applied in 20% to 50% of the total deposition area of the substrate 11 receiving the primer.

Figure 4:
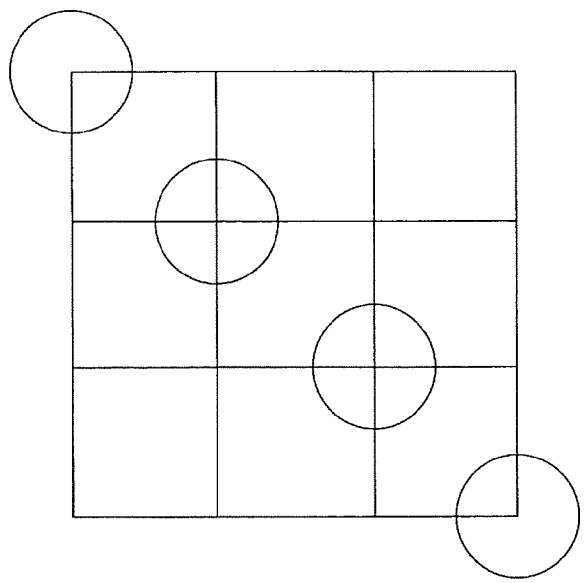
FIG. 4 is an explanatory diagram explaining primer ejection amount.

FIG. 4 is a conceptual diagram representing how the applied primer amount is controlled. It is assumed in the figure that each intersection of the grid represents a possible deposition site of the primer. Here, 100% application with respect to the total deposition area means depositing and landing the primer at all the intersections of the grid. In the case of 30% primer application with respect to the total deposition area as represented by the figure, the primer is deposited and landed in 30% of the all intersections of the grid.

The inkjet recording apparatus 30 of the present embodiment is controlled so that a single dot of the primer or the ink established on the print target is formed by three shots. Specifically, the recording head 32 ejects the primer or the ink three times onto the same position to form a single dot.

Each dot of the primer applied to 30% of the total deposition area is also formed by three shots. Further, the inkjet recording apparatus 30 of the present embodiment is configured to produce 23 pl±3 pl per dot of the primer or the ink.

Note that the present embodiment is not limited to the 3 shots/dot configuration, and a single dot may be formed by 1 to 2 shots, or 3 or more shots.

Experiments were conducted to examine how different primer ejection amounts varied in 10% increments from 10% to 100% with respect to the total deposition area affect the adhesion improving effect, cracking on an acryl substrate, and cracking on a stainless steel substrate.

The results are presented in FIG. 5.

The adhesion test was performed according to the crosscut tape method of JIS K 5600. In the cracking test, a print was left unattended in a temperature environment from room temperature to 60° C., and the print surface was observed by visual inspection after 1 hour.

The tests confirmed that the UV ink coating 16 was not detached, and had adhesion when the primer ejection amount was 30% or higher. At or below 20%, detachment of the UV ink coating 16 was observed.

In the case of the acryl substrate, cracking did not occur when the primer ejection amount was 30% or less. However, cracking occurred when the primer was 40% or more.

In the case of the stainless steel substrate, cracking did not occur when the primer ejection amount was 50% or less. However, cracking occurred when the primer was 60% or more.

Specifically, it was found that fewer primer ejection amounts produced poor adhesion, and caused detachment of the UV ink coating, whereas greater primer ejection amounts produced cracking in the UV ink coating because of the greater temperature-dependent volume change in the primer than in the UV ink coating.

The preferred primer ejection amount is thus 20% to 50%, further preferably 30% with respect to the total deposition area.

Note that it is not necessarily required to deposit the primer in all the total deposition area, because the primer dots that have landed on the predetermined positions are believed to spread and join the adjacent dots, and do not leave a vacant site where the primer did not land.

Figure 3:
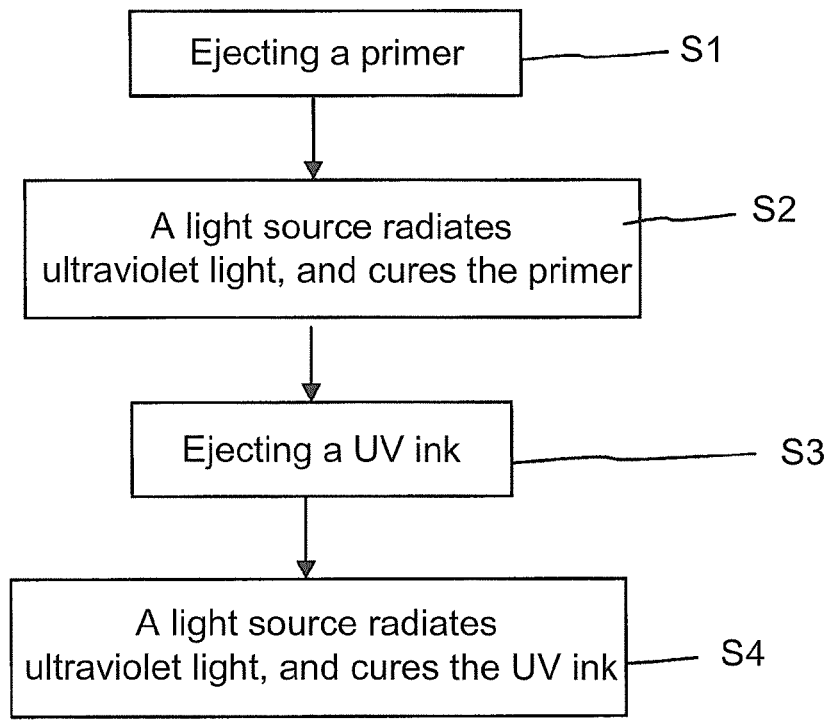
FIG. 3 is a flowchart explaining a UV ink printing method according to the present invention.

Then, refers back to descriptions of FIG. 3.

As mentioned above, the light source 35 radiates ultraviolet light and cures the primer as the recording head 32 moves in scan direction and ejects the primer in the predetermined proportion with respect to the total deposition area (step S2).

Because the primer remains adherent even after being cured, the adhesion with the subsequently ejected UV ink does not suffer.

The UV curing of the ejected primer is followed by UV ink ejection (step S3).

The UV ink is ejected in a controlled fashion so as to cover the total deposition area of the substrate 11, and prevent the primer from being exposed. The light source 35 radiates ultraviolet light, and cures the UV ink to form the UV ink coating 16 as the recording head 32 moves in scan direction and ejects the UV ink (step S4).

In the printing method described above, the primer layer 12 is formed on the whole surface of the intended print range of the substrate 11, and the UV ink coating 16 is formed over the primer layer 12.

However, the printing method of the present invention may be adapted to print the UV ink over the primer in the multi-pass mode. The multi-pass mode is the configuration where, for example, two recording heads are disposed in series along the substrate transport direction, and simultaneously scanned to save print time. Such arrangement of the recording heads is also called a staggered arrangement.

For example, the recording heads of the staggered arrangement may be used to eject the primer from the first (upstream) recording head, and the UV ink from the second (downstream) recording head. In this way, the exposure time of the adhesive primer can be reduced.

In the UV ink fixed structure, the UV ink coating 16 is formed over a wider range than the range of the primer layer 12 formed, and completely coats the adhesive primer layer 12. In this way, the adhesive primer layer 12 will not be exposed, and does not stick to other portions.

As described above, the inkjet recording apparatus 30 prints the primer layer 12 in 20% to 50% of the total deposition area. This is because desirable adhesion cannot be obtained when the proportion of the primer layer 12 deposited by the inkjet recording apparatus 30 is less than 20%, and cracking occurs when the proportion of the primer layer 12 is more than 50%. Cracking and detachment of the UV ink can thus be prevented with the primer landed on the substrate 11 in the foregoing range.

The invention claimed is:

1. A UV ink fixed structure, comprising:
   a substrate;
   a UV ink coating, having a surface hardness higher than a pencil hardness H; and
   an adhesive primer layer, provided between the substrate and the UV ink coating,
   wherein the UV ink coating is formed over a wider range than a range of the adhesive primer layer formed.

2. A UV ink fixed structure, comprising:
   a substrate;
   a UV ink coating, having a surface hardness higher than a pencil hardness H; and
   an adhesive primer layer, provided between the substrate and the UV ink coating,
   wherein the adhesive primer layer is formed by inkjet printing in 20% to 50% of a total deposition area.

3. A printing method, comprising:
   printing an adhesive primer with an inkjet recording apparatus to form a primer layer on a substrate; and
   printing a UV ink with the inkjet recording apparatus to form a UV ink coating on the adhesive primer layer, the UV ink exhibiting a surface hardness higher than a pencil hardness H upon being cured,
   wherein the inkjet recording apparatus prints the adhesive primer layer in 20% to 50% of a total deposition area.

4. The UV ink fixed structure according to claim 1, wherein the adhesive primer layer is formed by inkjet printing in 20% to 50% of a total deposition area.

* * * * *